(12) United States Patent
Haselden et al.

(10) Patent No.: US 7,409,578 B2
(45) Date of Patent: Aug. 5, 2008

(54) GRACEFUL LOAD FAIL OVER

(75) Inventors: Kirk Haselden, Sammamish, WA (US); Matthew E David, Sammamish, WA (US); Mohammed F Shatnawi, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 530 days.

(21) Appl. No.: 11/042,903

(22) Filed: Jan. 25, 2005

(65) Prior Publication Data

US 2006/0168492 A1    Jul. 27, 2006

(51) Int. Cl.
*G06F 11/00*    (2006.01)
(52) U.S. Cl. .............................. 714/4; 714/26; 714/38; 714/39
(58) Field of Classification Search ...................... 714/4, 714/26, 38, 39
See application file for complete search history.

(56) References Cited

U.S. PATENT DOCUMENTS 6,601,192 B1 * 7/2003 Bowman-Amuah .......... 714/38
7,092,987 B2 * 8/2006 Brittingham et al. ........ 709/203

* cited by examiner

*Primary Examiner*—Robert W Beausoliel, Jr.
*Assistant Examiner*—Charles Ehne
(74) *Attorney, Agent, or Firm*—Amin, Turocy & Calvin, LLP

(57) ABSTRACT

Systems and methodologies that facilitate real time recognition of missing and/or invalid objects in a component based framework, via employing a graceful load fail over engine that can self heal a component based application that has missing or invalid references, to be properly read, validated and executed on a user's machine. Information about the various components installed on a user's machine can be stored to reference a package backed up to a persistence state, and/or dummy objects or stubs can be provided to represent the missing object, and typically assure proper validation and/or execution of loaded object models.

19 Claims, 8 Drawing Sheets

GRACEFUL LOAD FAIL OVER

TECHNICAL FIELD

The subject invention relates generally to successfully loading packages in distributed object systems, and in particular to a self healing application with real time recognition of missing and/or invalid objects and a graceful management thereof, for a proper read, load and execution of the application.

BACKGROUND OF THE INVENTION

Increasing advances in computer technology (e.g., microprocessor speed, memory capacity, data transfer bandwidth, software functionality, and the like) have generally contributed to enhanced computer application in various industries. Ever more powerful server systems, which are often configured as an array of servers, are commonly provided to service requests originating from external sources such as the World Wide Web, for example.

As software systems have become more complicated, it has become common to build such systems from a plurality of objects and files. For example, a software system may include hundreds of files or objects, wherein building a software or application system can be undertaken on one or more build machines that can compile, assemble, link, and/or interpret files or objects. Typically, object-oriented computing is based upon the object model, wherein pieces of code called "objects" contain data (e.g., attributes) and may have actions (e.g., operations) performed thereon. An object can be defined by its interface, wherein the interface defines the characteristics and behavior of a kind of object, including the operations that can be performed on objects of that interface and the parameters to each operation. A specific instance of an object is identified within a distributed object system by a unique identifier called an object reference.

Many of the requisite files in the completed software product can be built in various stages, thus requiring a plurality of sources and/or generated/built files. Files generated by one part of the build process can be required as inputs to one or more other parts of the build process, and the build machines can have complete copies of the source files. For example, if a build machine A generates a file A1, and a build machine B generates a file B2, build machine A may need file B1 to produce a file A2, and build machine B may need file A1 to produce file B2. At the same time, objects loaded on a machine can become corrupted or even fail to properly load during a read, validation or execution.

In a distributed object system, a client can also create a proxy that images an object on a server. Typically, a proxy is an image of an object where the object resides in a different logical and/or physical entity (e.g., machine, process, network, and the like.) In distributed systems, proxies can facilitate local processing to improve efficiency. The object that is imaged can implement a first set of one or more interface and base class data types. Moreover, such objects can require that a proxy load a first set of one or more attributes and/or methods to image the object. When the proxy is created for the object that is imaged, the interface and base data types implemented by the object are typically automatically loaded into the client. Nonetheless and as explained earlier, objects loaded on a machine can become corrupted or even fail to properly load during a read, validation, or execution.

Distributing files necessary to complete the build of the software system to the build machines involved in the build is network bandwidth intensive, requiring large transfers of information, some of which can become corrupted or even unavailable during an up load. For example, one build machine can only need ten files to complete its portion of the build, while another build machine can need two hundred files to complete its portion of the build, and yet one missing file or object can hinder a proper operation of a requisite application, e.g., by failing to properly load during a read, validation, or execution.

Therefore, there is a need to overcome the aforementioned exemplary deficiencies associated with conventional systems and devices.

SUMMARY OF THE INVENTION

The following presents a simplified summary of the invention in order to provide a basic understanding of one or more aspects of the invention. This summary is not an extensive overview of the invention. It is intended to neither identify key or critical elements of the invention, nor to delineate the scope of the subject invention. Rather, the sole purpose of this summary is to present some concepts of the invention in a simplified form as a prelude to the more detailed description that is presented hereinafter.

The subject invention facilitates real time recognition of missing and/or invalid objects in a component based framework, via employing a graceful load fail over engine that can self heal a component based application, which has missing or invalid references to be properly read, validated, and executed on a user's machine. As such, information about the various components installed on a user's machine can be stored to reference a package backed up to a persistence state, wherein a persistence infrastructure (e.g., data structures in non-volatile storage, such as a file system or a relational database) can supply information about missing references and/or objects. Moreover, a plurality of stubs or dummy objects in a designer or user interface can be provided to supply information about a missing object, and typically assure proper validation and/or execution of loaded object models.

In yet another aspect, the graceful load fail over engine of the subject invention includes a detector component, which detects a missing reference and/or objects, and a notification component that notifies a user where to download missing objects and/or obtain additional information about resolving problems associated with missing references and/or objects. Accordingly, in component driven architectures wherein a product can be built from a plurality of smaller pieces, such as packages that contain a group of functionalities, a graceful load fail over can be provided to mitigate problems associated with referenced components that are not properly installed. Such a graceful load fail over can typically assure proper validation and/or execution of loaded object models with missing or corrupt segments.

Presentation of information to the user about the missing object can be in the form of providing various shapes of streaming information, provide a class identification, and the like. In addition, a monitor component can observe the missing and/or invalid packages and provide a process that installs such missing packages.

In yet a further aspect of the subject invention, methodologies are provided that store information about the packets, wherein upon uploading the packets on a machine, any missing and/or invalid reference can be detected, and subsequently a user can be supplied with the ability to download the missing object or obtain information about how to resolve the issue.

In another aspect according to the invention, when one or more packages that contain objects (tasks, connection managers, pipe line components, and the like) fail to load during loading of an application on a user's machine, dummy objects can be supplied to the user to provide contact information about how to resolve the problems related to such missing packages and to properly run the application. Accordingly, since the invention allows packages with invalid or missing objects to continue to load successfully, typically relationships between an invalid object and package are maintained, e.g., precedence constraints, scope membership, and configuration. In addition, a persistence infrastructure (e.g., data structures in non-volatile storage such as a file system or a relational database) can also supply information about missing references and/or objects. Moreover, in a further aspect of the subject invention, various artificial intelligence schemes can be employed to determine whether execution of a downloaded application can occur without missing objects, and/or to facilitate searching for missing objects.

To the accomplishment of the foregoing and related ends, the invention comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

DETAILED DESCRIPTION OF THE INVENTION

Figure 1:
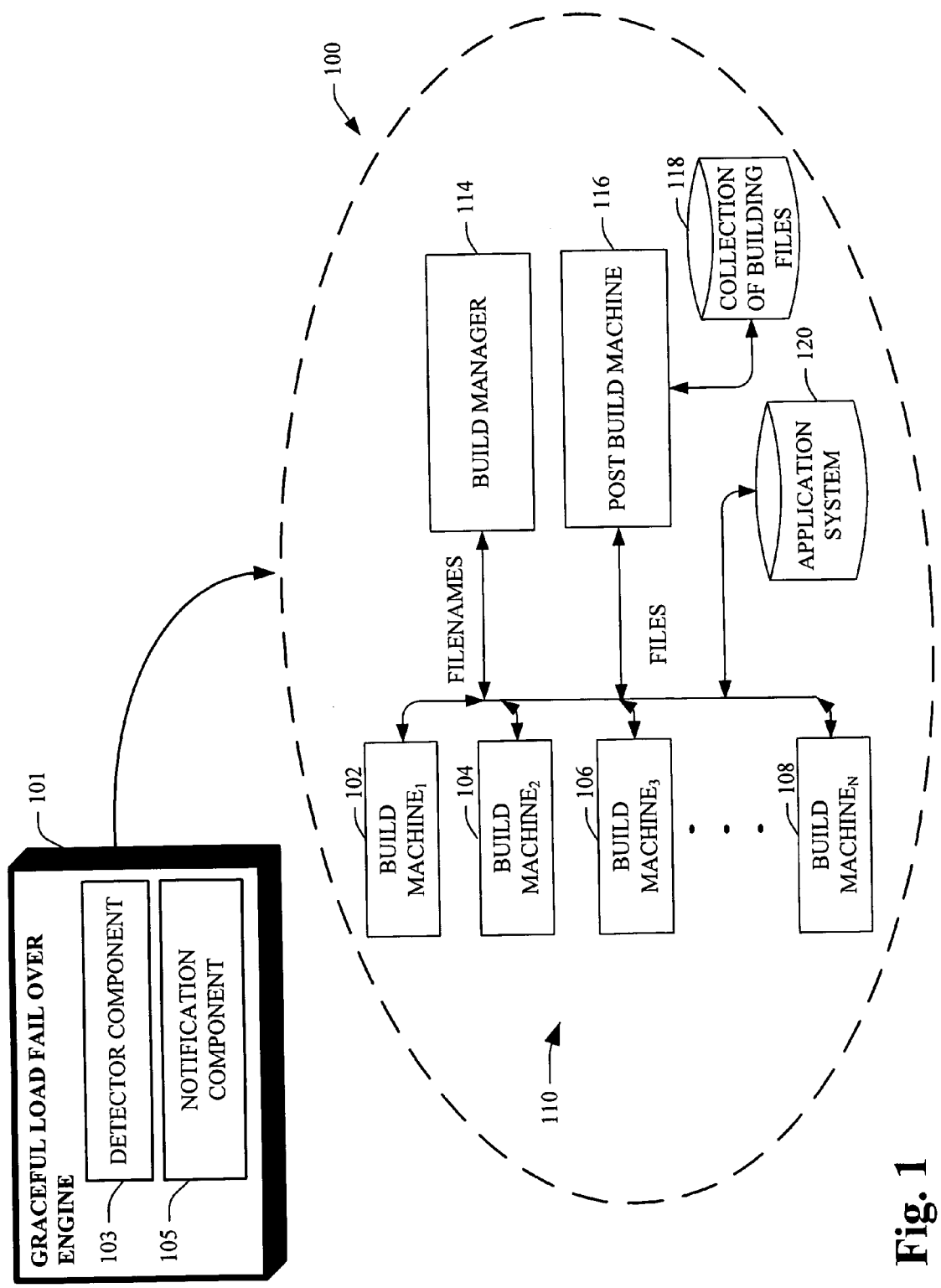
FIG. 1 illustrates a schematic block diagram of a component based environment with a graceful load fail over engine in accordance with an aspect of the subject invention.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component", "handler", "model", "system," and the like are intended to refer to a computer-related entity, hardware, a combination of hardware and software, software, or software in execution. For example, a component can be, but is not limited to being, a process running on a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal).

The subject invention provides for real time recognition of missing and/or invalid objects in a component based framework, via employing a graceful load fail over engine that can self heal a component based application with missing or invalid references to be properly read, validated and executed on a user's machine. Referring initially to FIG. 1, there is illustrated graceful load fail over engine 101 that can facilitate building an application from packets (e.g., a group of functionalities) by employing a detector component 103 that detects missing references and/or objects and a notification component 105 that notifies a user where to download missing objects and/or obtain additional information about resolving problems associated with missing references. As such, during uploading packets on a machine, the graceful load fail over engine 101 can detect any missing and/or invalid references and/or objects and subsequently enable a user to download the missing and/or invalid references and/or objects, and/or obtain information about how to resolve issues related to proper read, load, and execution of the missing and/or invalid reference and/or objects.

As illustrated, a component based system 100 can manage the distribution and collection of packets and/or files involved in building an application system 120. Moreover, in such a component driven architecture environment, typically components can be referred to as a specific piece of functionality that can be accessed through a contractually specified interface. Such components can be self-contained and clearly identifiable artifacts that describe and/or perform specific functions. For example, basic capabilities of the component based system 100 can include interoperability across networks, portability on different hardware or software platforms, and ability of self-managing data resources.

The component based system 100 can include a plurality of build machines 102, 104, 106, 108 (1 thru N, where N is an integer) collectively referred to as the build machines 110. It is to be appreciated by one skilled in the art that the build machines 110 can be physical machines (e.g. one or more computers), and/or virtual machines (e.g. one or more processes running on one or more computers). The build machines 110 can produce one or more build files employed in the application system 120.

The build machines 110 can compile, assemble, interpret, and/or link one or more source files into one or more build files. As one segment of the build machines 110 builds one or more build files, another segment of the build machines 110 can compile lists of the names of build files that are published. For example, a published file can be one which is listed as a published file in one or more make files associated with a software system or application 120 being built. The build machines 110 can then transmit the lists of build file names to a build manager 114. One segment of the build machines 110 can also be designated as a post build machine 116, wherein the build manager 114 can then determine, for each segment of the build machines 110 a list containing a subset of names of build files that the build machines 110 should transmit to the post build machine 116, which creates a collection or set 118 of build files. The build manager 114 can also determine, for each segment of the build machines 110, a list containing a subset of the names of files that the build machines 110 should receive back from the post build machine 116. Once the lists of the names of the files to transmit to, and receive from, the post build machine 116 have been distributed to the build machines 110, the files can be transferred to and from the post build machine 116. The file transfers can be initiated, for example, by a segment of the build machines 110, the build manager 114, the post build machine 116, or another process. The component based system 100 can undergo one or more stages of the processes described above to complete building the application 120 on a user's machine. At one or more stages, the component based system 100 can wait for the build machines 110 to complete their building and copying to the post build machine 116 before initiating acquiring files from the post build machine 116. It is to be appreciated that although the build manager 114 and the post build machine 116 are illustrated independently, the processes executed by the build manager 114 and/or the post build machine 116 can execute on the same physical and/or virtual machine or machines. To heal the application 120 when encountering a missing object or reference, the graceful load fail over engine 101 can employ a detector component 103 that upon uploading packets on a machine, can detect any missing and/or invalid reference or object, and subsequently a user is enabled to download the missing reference or object or obtain information about how to resolve the issue, via the notification component 105.

Figure 2:
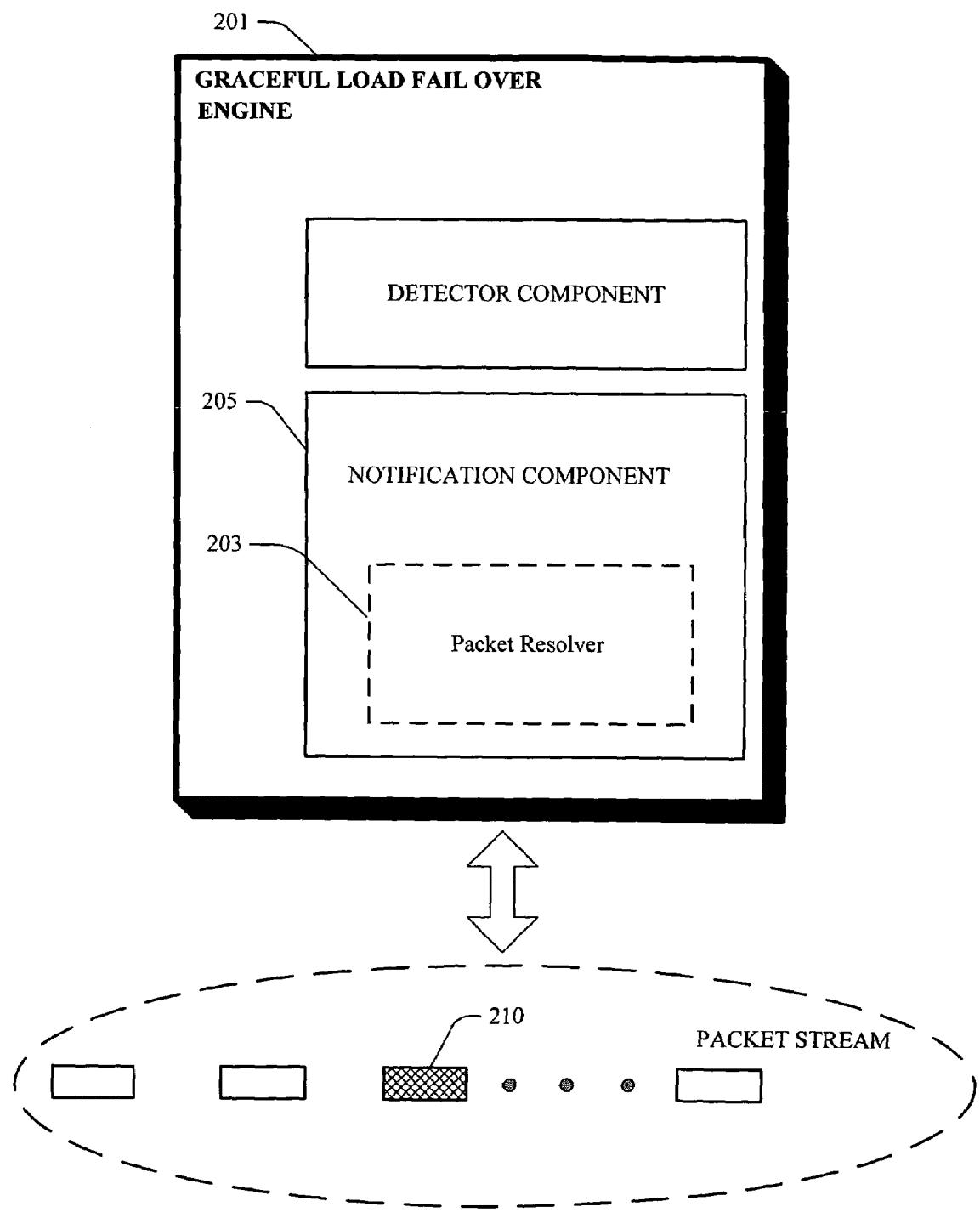
FIG. 2 illustrates an exemplary graceful load fail over engine in accordance with an exemplary aspect of the subject invention.

FIG. 2 illustrates a graceful load fail over engine 201 in accordance with a further aspect of the subject invention, wherein a packet resolver 203 operates as part of notification component 205. The graceful load fail over engine 201 operates in a distributed object system, wherein packet dummy objects 210 and/or stubs can be provided instead of the failed objects and/or missing references. Such dummy objects 210 can typically maintain relationships that invalid objects have with the rest of the packages, such as precedence constraints, scope member ship, and configuration.

Thus, if upon uploading an application on a user's machine, a packet or reference is missing, then the packet resolver 203 can facilitate supplying a dummy object and/or stub that can provide contact information about how to resolve the problems related to the missing package for a proper run of the application. The packet resolver 203 can determine which of the components are missing and/or unavailable for an upload, and which components need to be obtained from third parties. Such items can be retrieved and stored persistently, wherein the packet resolver 203 can undergo one or more iterations of the processes described above in uploading the application.

Accordingly, the graceful load fail over of the subject invention can mitigate problems associated with referenced components that are not properly installed, by presenting to a user in a form of a stub or dummy object in the designer or user interface to represent the missing object. Presentation to the user can be in the form of providing typically various shapes of streaming information, providing a class identification, and the like.

Figure 3:
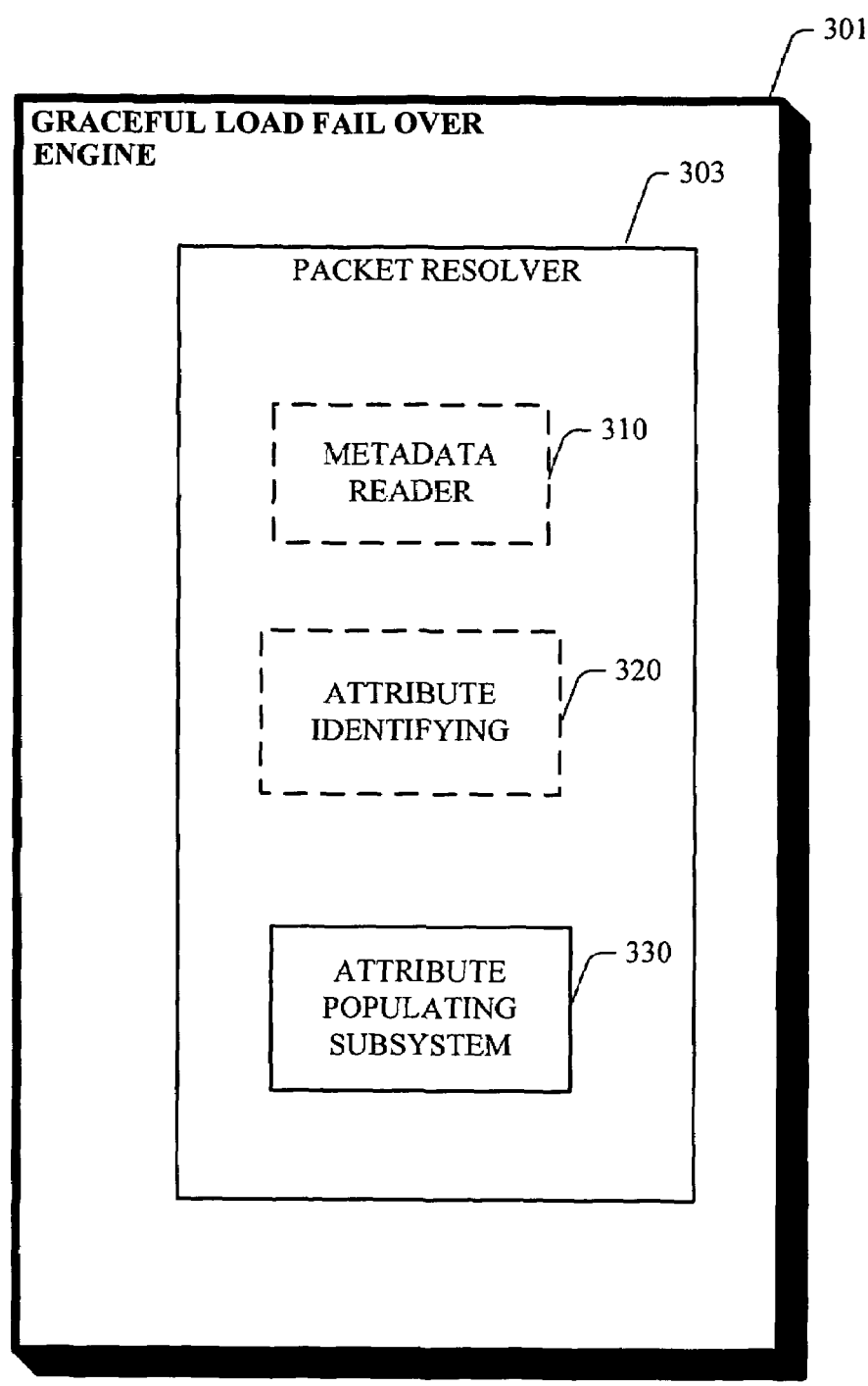
FIG. 3 illustrates a detailed block diagram of a packet resolver that can supply information about the missing objects and/or references according to a particular aspect of the subject invention.

Turning now to FIG. 3, there is illustrated a detailed block diagram of a packet resolver 303 that can supply information about the missing objects and/or references. The packet resolver 303 can include one or more subsystems (e.g., a metadata reader 310, an attribute identifying subsystem 320, an attribute populating subsystem 330) to facilitate healing capabilities provided by the graceful load fail over engine 301. The metadata reader 310 can take as inputs one or more pieces of metadata associated with one or more missing objects and/or data types that are to be resolved. Such metadata can contain information including, for example, a list of attributes in a data type associated with the metadata (where the list includes attribute names, types, sizes, and the like), parameter types, parameter sizes, addresses and the like, and information identifying one or more classes that can be employed to interact with a data type if the entity with which an interaction is desired does not have the definition of the data type (e.g., a parent class) available.

In addition, data structures related to the missing objects and references can include: an array, a list, a heap, a stack, a table, a database record, a database table, a database, and a data cube that can be employed in accordance with the subject invention. Accordingly, such information identifying one or more classes of the missing references and/or objects can be employed to interact with the data type and to determine where such data can be obtained from. The metadata reader 310 can be operatively linked to attribute identifying subsystem 320 and attribute populating subsystem 330, facilitate such subsystems in identifying and/or comparing mismatched or missing objects and/or data types to source references.

In addition, once the packet resolver 303, via the attribute identifying subsystem 320, has determined the missing references and/or objects, then the attribute populating subsystem 330 can be employed to retrieve values and/or download the missing references and/or objects from third party sources. Accordingly, in the component-based programming environments, the subject invention can facilitate real time recognition of missing and/or invalid objects, and self-heal an application for a proper read, validation, and execution thereof on a user's machine.

Figure 4:
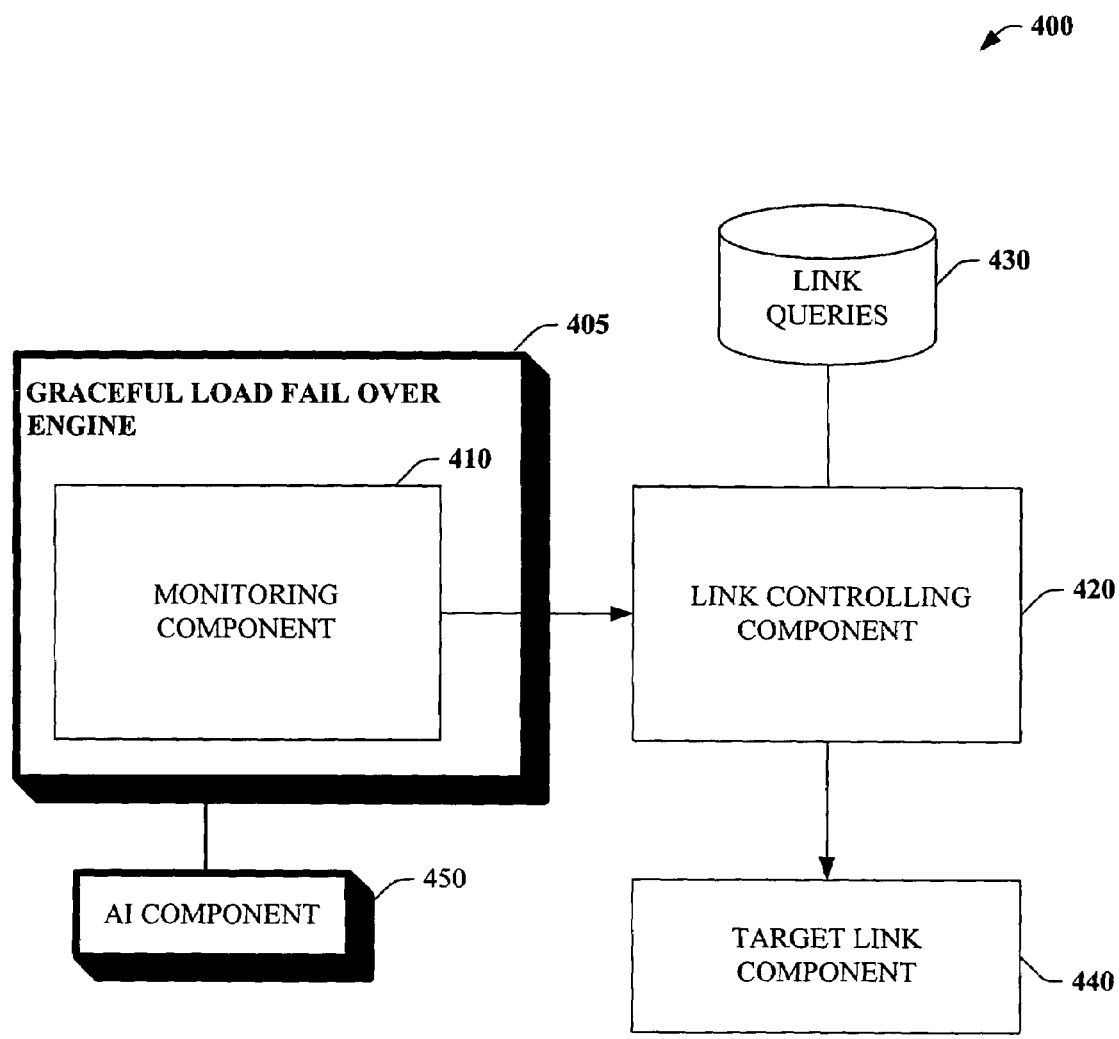
FIG. 4 illustrates a general block diagram of a monitoring system as part of the graceful load fail over engine in accordance with a further aspect of the subject invention.

Referring now to FIG. 4, there is illustrated a general block diagram of a monitoring system 410 as part of the graceful load fail over engine in accordance with a particular aspect of the subject invention. The monitoring system 410 can actively observe missing objects and/or references and supply real-time hyperlinks to a user, so that the user can download the missing objects and/or references. As such, the monitoring system 410 can supply respective target sites that correspond to a web link for providing information about missing references and/or objects.

Accordingly, when a missing object and/or reference is encountered by the monitoring component 410, then information about such missing objects can be gathered or collected by and communicated to a link controlling component 420. The link controlling component 420 can examine the information communicated from the monitoring component 410 and compare it to one or more stored link queries 430. The link queries 430 can comprise a plurality of different queries for a plurality of links (e.g., hyperlinks). For example, for any given link, at least one query can be set or programmed by a user. A query can include a set of conditions to be met or actions to be performed on a link when one or more conditions are satisfied. Each query can correspond to at least one hyperlink and an associated target site.

Moreover, when the monitoring component 410 has determined that a missing reference and/or object has been detected, it can also notify a user via a target link component 440 (e.g., browser). Examples of notification actions when detecting a missing reference and/or object can include changing the color of a hyperlink, modifying the title of a hyperlink to indicate that content needs to be accessed to resolve issues relating to the missing reference and/or object, and/or adding or removing a symbol from a hyperlink. Other types of notification actions are possible as well, such as highlighting a hyperlink, drawing a line around a hyperlink, and/or adding some form of animation to a hyperlink (e.g., blinking text, fade-in/out text, etc.). A user can also receive an email or sound notification to alert the user that a missing reference and/or component has been encountered. Moreover, a user can simply refer to a hyperlink monitor list to glance at hyperlinks to quickly ascertain whether a target website needs to be contacted for successfully loading missing references and/or objects. Accordingly, despite the existence of missing objects, a user is provided with the requisite information to initiate a successful upload of an application.

Also, in connection with accessing a proper link and/or locating links for missing objects and/or references, the subject invention can employ various artificial intelligence schemes. For example, a process for learning explicitly or implicitly whether an object should be reloaded, or for searching for a website that can provide missing objects or references, can be facilitated via an automatic classification system and process. Classification can employ a probabilistic and/or statistical-based analysis (e.g., factoring into the analysis utilities and costs) to infer an action that a user desires to be automatically performed. For example, a support vector machine (SVM) classifier can be employed. Other classification approaches, including Bayesian networks, decision trees, and probabilistic classification models providing different patterns of independence, can be employed. Classification as used herein includes statistical regression that is utilized to develop models of priority.

As will be readily appreciated from the subject specification, the subject invention can employ classifiers that are explicitly trained (e.g., via generic training data) as well as implicitly trained (e.g., via observing user behavior, receiving extrinsic information), so that a classifier is used to automatically determine an answer to a question according to a predetermined criteria. For example, with respect to SVM's that are well understood, SVM's are configured via a learning or training phase within a classifier constructor and feature selection module. A classifier is a function that maps an input attribute vector, $x=(x1, x2, x3, x4, xn)$, to a confidence that the input belongs to a class—that is, $f(x)=confidence(class)$. As shown in FIG. 4, an artificial intelligence (AI) component 450 can be employed to facilitate inferring and/or determining when, where, and how to locate contact information for a missing reference and/or object in accordance with the subject invention. The AI component 450 can employ any of a variety of suitable AI-based schemes as described supra in connection with facilitating various aspects of the herein described invention.

Figure 5:
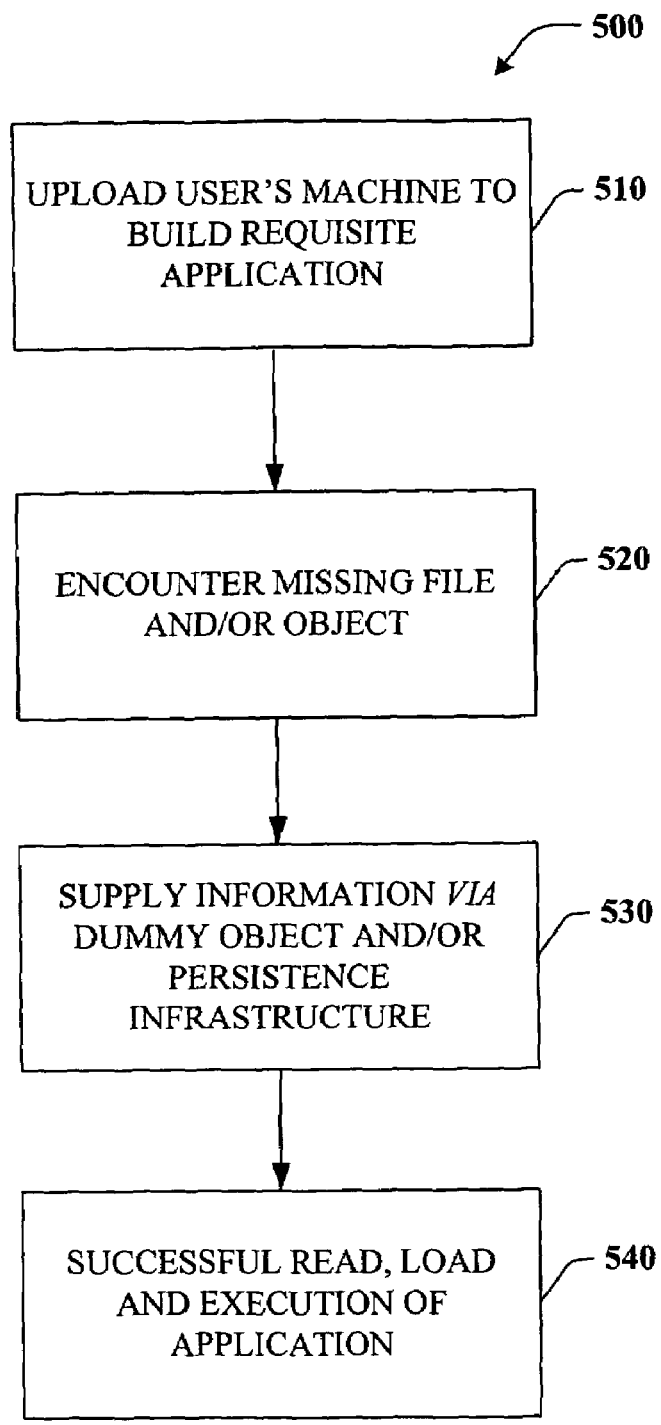
FIG. 5 illustrates an exemplary methodology of providing dummy objects and/or stubs for a proper validation and/or execution of object models, in accordance with an aspect of the graceful load fail over of the subject invention.

FIG. 5 illustrates a related methodology of providing dummy object(s) and/or stubs for a proper validation and/or execution of object models, in accordance with an aspect of the graceful load fail over of the subject invention. Initially, and at 510, a user's machine is uploaded with packages for building a requisite software system. Next, and at 520, if upon uploading an application on a user's machine, a packet or reference is found to be missing, a dummy object and/or stub can be supplied at 530 that can function as a variable without data, yet it can reserve space that a real variable can employ later. For example, when a package that contains objects (tasks, connection managers, pipe line components, and the like) fails to load while uploading an application on a user's machine, dummy objects can be supplied to a user to provide contact information about how to resolve problems related to such load failures, and hence enable a user to properly run the application. As indicated at 530, a persistence infrastructure (e.g., data structures in non-volatile storage such as a file system or a relational database) can also supply information about missing references and/or objects. Such a graceful load fail over mitigates problems associated with referenced components that are not properly installed.

Figure 6:
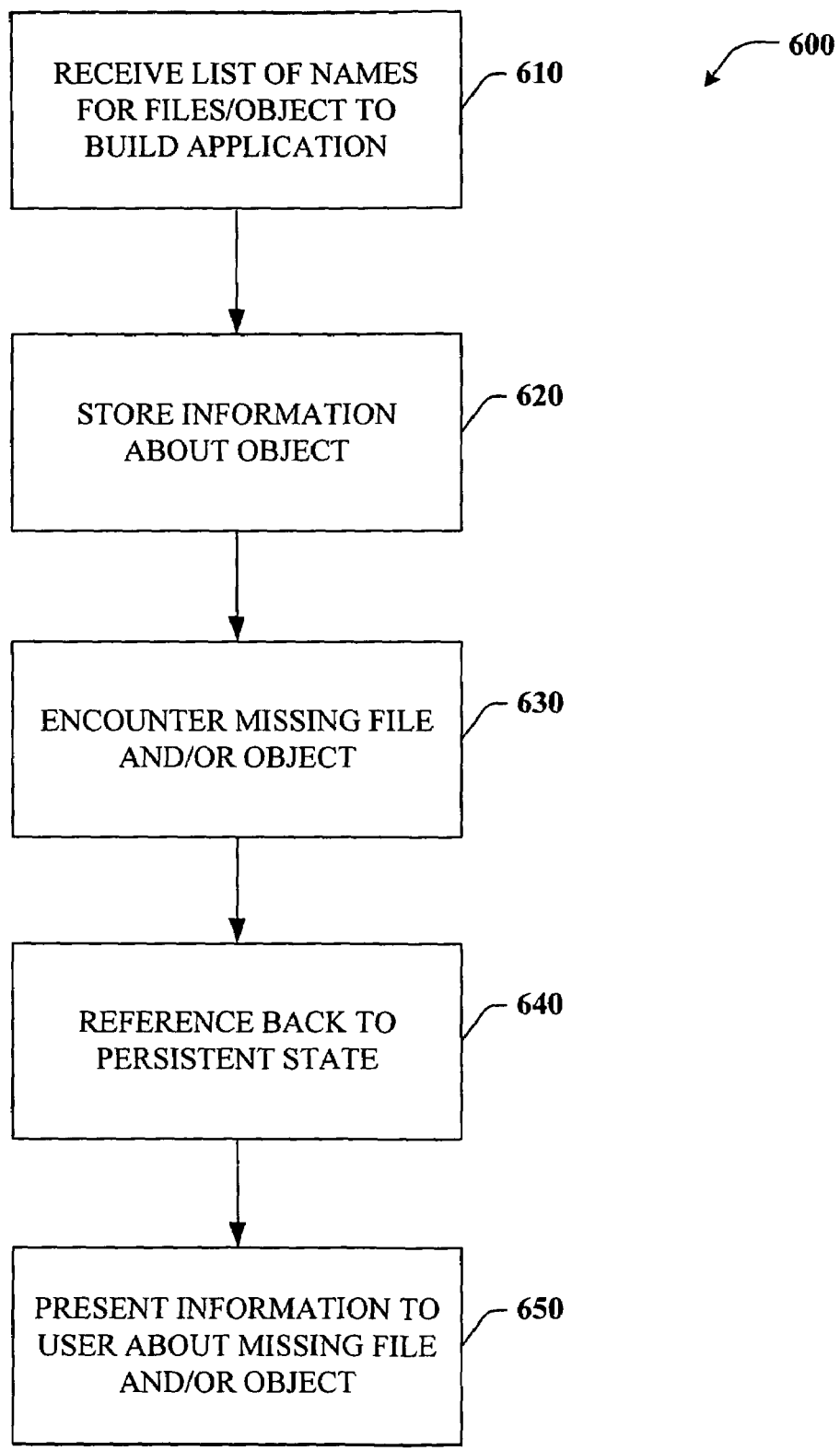
FIG. 6 illustrates a further flow chart for a methodology of self healing an application in accordance with an aspect of the subject invention.

FIG. 6 illustrates a flow chart for a methodology of self healing an application in accordance with an aspect of the subject invention. Initially, and at 610, a list of objects and/or files can be transferred to a build process in accordance with an aspect of the subject invention, including a list of files that a build process should synchronize with or receive as determined by the build manager, as explained in detail supra. The build machine can farther persistently store information about build files and/or objects as part of the infrastructure at 620. As such, a persistence infrastructure (e.g., data structures in non-volatile storage such as a file system or a relational database) can also supply information about missing references and/or objects.

The methodology then proceeds to 630, wherein during a read, validation, or execution of a requisite application, a missing and/or corrupted object is encountered. Next and at 640, a reference back to a persistent state, to supply required information about missing objects, can be provided. A user can then be enabled to download missing objects or obtain information about how to resolve the issue at 650, such as by typically providing: various forms of streaming information, a class identifications and the like. Such graceful load fail over mitigates problems associated with referenced components that are not properly installed, and allows packages with invalid or missing objects to continue to load successfully.

While the exemplary method is illustrated and described herein as a series of blocks representative of various events and/or acts, the present invention is not limited by the illustrated ordering of such big blocks. For instance, some acts or events may occur in different orders and/or concurrently with other acts or events, apart from the ordering illustrated herein, in accordance with the invention. In addition, not all illustrated blocks, events or acts, may be required to implement a methodology in accordance with the present invention. Moreover, it will be appreciated that the exemplary method and other methods according to the invention may be implemented in association with the method illustrated and described herein, as well as in association with other systems and apparatus not illustrated or described.

Figure 7:
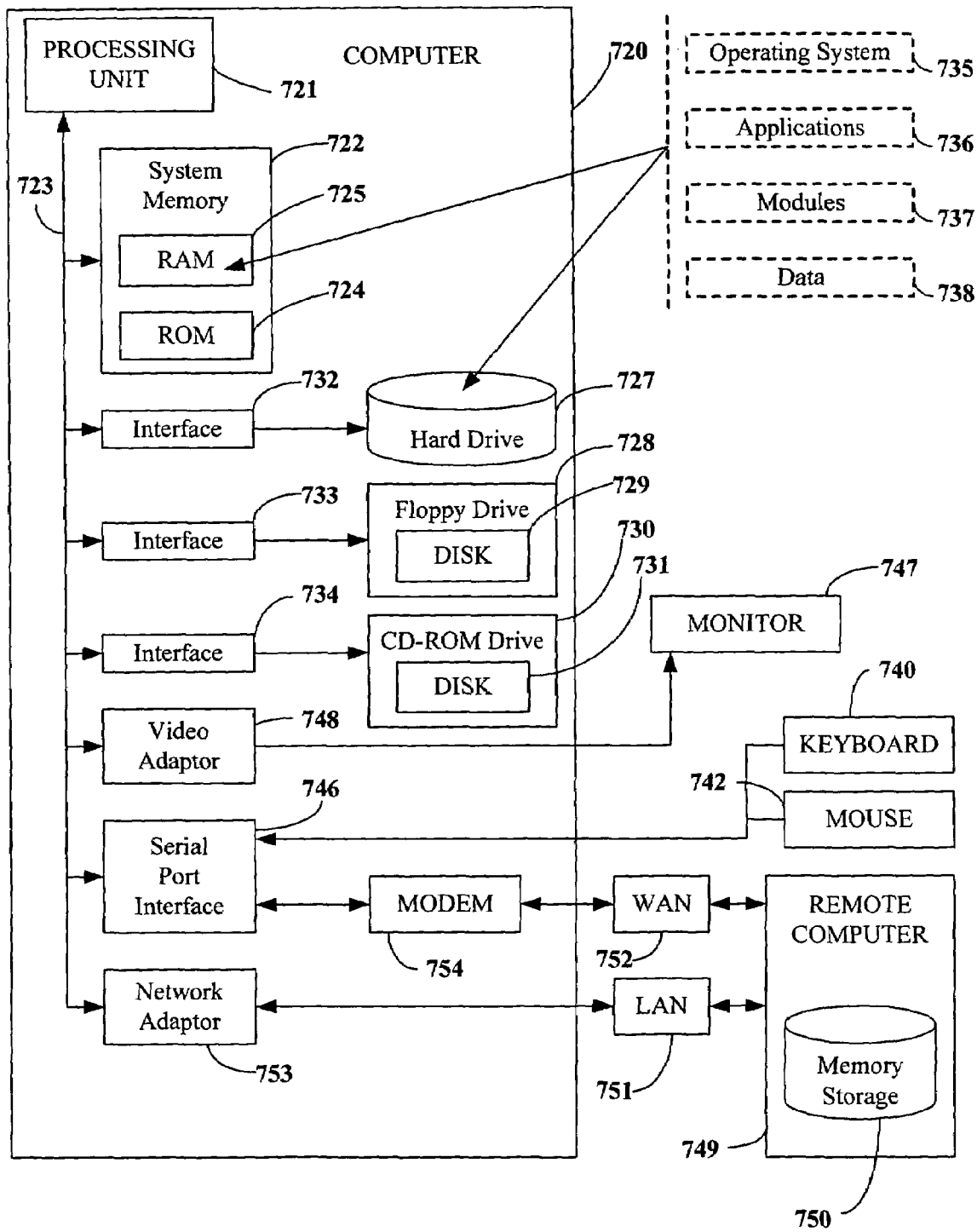
FIG. 7 illustrates a brief, general description of a suitable computing environment wherein the various aspects of the subject invention can be implemented.

Referring now to FIG. 7, a brief, general description of a suitable computing environment is illustrated wherein the various aspects of the subject invention can be implemented. While the invention has been described above in the general context of computer-executable instructions of a computer program that runs on a computer and/or computers, those skilled in the art will recognize that the invention can also be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like. As explained earlier, the illustrated aspects of the invention can also be practiced in distributed computing environments where tasks are performed by remote processing devices that are linked through a communications network. However, some, if not all aspects of the invention can be practiced on stand-alone computers. In a distributed computing environment, program modules can be located in both local and remote memory storage devices. The exemplary environment includes a computer 720, including a processing unit 721, a system memory 722, and a system bus 723 that couples various system components including the system memory to the processing unit 721. The processing unit 721 can be any of various commercially available processors. Dual microprocessors and other multi-processor architectures also can be used as the processing unit 721.

The system bus can be any of several types of bus structure including a USB, 1394, a peripheral bus, and a local bus using any of a variety of commercially available bus architectures. The system memory may include read only memory (ROM) 724 and random access memory (RAM) 725. A basic input/output system (BIOS), containing the basic routines that help to transfer information between elements within the computer 720, such as during start-up, is stored in ROM 724.

The computer 720 further includes a hard disk drive 727, a magnetic disk drive 728, e.g., to read from or write to a removable disk 727, and an optical disk drive 730, e.g., for reading from or writing to a CD-ROM disk 731 or to read from or write to other optical media. The hard disk drive 727, magnetic disk drive 728, and optical disk drive 730 are connected to the system bus 723 by a hard disk drive interface 732, a magnetic disk drive interface 733, and an optical drive interface 734, respectively. The drives and their associated computer-readable media provide nonvolatile storage of data, data structures, computer-executable instructions, etc. for the computer 720. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment, and further that any such media may contain computer-executable instructions for performing the methods of the subject invention.

A number of program modules can be stored in the drives and RAM 725, including an operating system 735, one or more application programs 736, other program modules 737, and program data 738. The operating system 735 in the illustrated computer can be substantially any commercially available operating system.

A user can enter commands and information into the computer 720 through a keyboard 740 and a pointing device, such as a mouse 742. Other input devices (not shown) can include a microphone, a joystick, a game pad, a satellite dish, a scanner, or the like. These and other input devices are often connected to the processing unit 721 through a serial port interface 746 that is coupled to the system bus, but may be connected by other interfaces, such as a parallel port, a game port or a universal serial bus (USB). A monitor 747 or other type of display device is also connected to the system bus 723 via an interface, such as a video adapter 748. In addition to the monitor, computers typically include other peripheral output devices (not shown), such as speakers and printers.

The computer 720 can operate in a networked environment using logical connections to one or more remote computers, such as a remote computer 747. The remote computer 747 may be a workstation, a server computer, a router, a peer device or other common network node, and typically includes many or all of the elements described relative to the computer 720, although only a memory storage device 750 is illustrated in FIG. 7. The logical connections depicted in FIG. 7 may include a local area network (LAN) 751 and a wide area network (WAN) 752. Such networking environments are commonplace in offices, enterprise-wide computer networks, Intranets and the Internet.

When employed in a LAN networking environment, the computer 720 can be connected to the local network 751 through a network interface or adapter 753. When utilized in a WAN networking environment, the computer 720 generally can include a modem 754, and/or is connected to a communications server on the LAN, and/or has other means for establishing communications over the wide area network 752, such as the Internet. The modem 754, which can be internal or external, can be connected to the system bus 723 via the serial port interface 746. In a networked environment, program modules depicted relative to the computer 720, or portions thereof, can be stored in the remote memory storage device. It will be appreciated that the network connections shown are exemplary and other means of establishing a communications link between the computers can be employed.

In accordance with the practices of persons skilled in the art of computer programming, the subject invention has been described with reference to acts and symbolic representations of operations that are performed by a computer, such as the computer 720, unless otherwise indicated. Such acts and operations are sometimes referred to as being computer-executed. It will be appreciated that the acts and symbolically represented operations include the manipulation by the processing unit 721 of electrical signals representing data bits which causes a resulting transformation or reduction of the electrical signal representation, and the maintenance of data bits at memory locations in the memory system (including the system memory 722, hard drive 727, floppy disks 728, and CD-ROM 731) to thereby reconfigure or otherwise alter the computer system's operation, as well as other processing of signals. The memory locations wherein such data bits are maintained are physical locations that have particular electrical, magnetic, or optical properties corresponding to the data bits.

Figure 8:
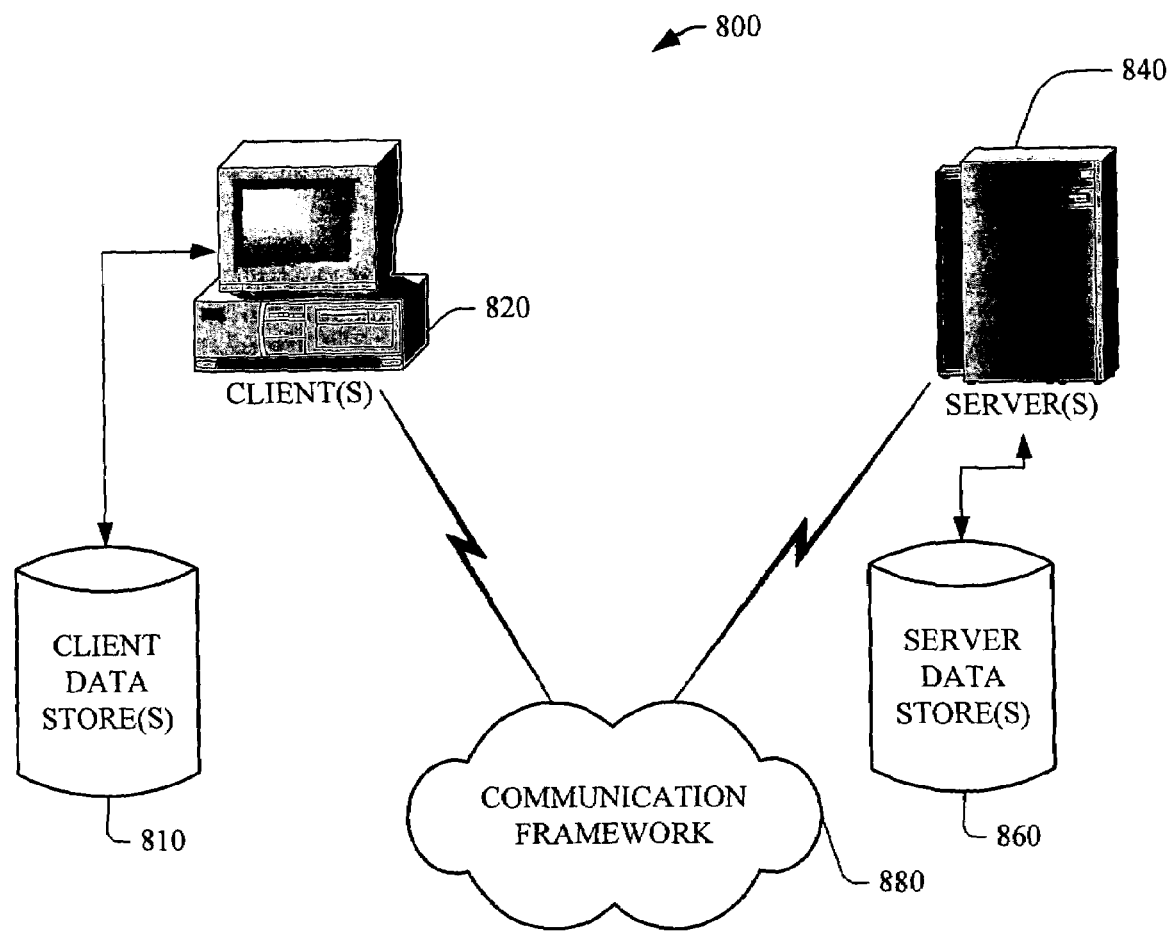
FIG. 8 illustrates a client-server system that can employ a graceful load fail over engine according to one aspect of the present invention.

Referring now to FIG. 8, a client-server system 800 that can employ a graceful load fail over engine according to one aspect of the present invention is illustrated. The client(s) 820 can be hardware and/or software (e.g., threads, processes, computing devices). The system 800 also includes one or more server(s) 840. The server(s) 840 can also be hardware and/or software (e.g., threads, processes, computing devices). For example, such servers 840 can house threads to perform transformations by employing the present invention. The client 820 and the server 840 can communicate, in the form of data packets transmitted according to the present invention, between two or more computer processes. As illustrated, the system 800 includes a communication framework 880 that can facilitate communications between the client(s) 820 and the server(s) 840. The client(s) 820 is operationally connected to one or more client data store(s) 810 that can store information local to the client(s) 820. Moreover, client 820 can access and update databases 860 located on a server computer 840 running a server process. In one aspect of the present invention, the communication frame work 880 can be the internet, with the client process being a Web browser and the server process being a Web server. As such, a typical client 820 can be a general purpose computer, such as a conventional personal computer having a central processing unit (CPU), system memory a modem or network card for connecting the personal computer to the Internet, and a display as well as other components such as a keyboard, mouse, and the like. Likewise a typical server 840 can be university or corporate mainframe computers, or dedicated workstations, and the like.

Although the invention has been shown and described with respect to certain illustrated aspects, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention. Furthermore, to the extent that the terms "includes", "including", "has", "having", and variants thereof are used in either the detailed description or the claims, these terms are intended to be inclusive in a manner similar to the term "comprising."

What is claimed is:

1. A computer implemented system that facilitates operation of a component based application comprising a memory having stored therein the following computer executable components:
    a graceful load fail over engine that provides real time information about missing or corrupted objects, to self heal the component based application for a proper read, validation, and execution thereof on a user's machine, the graceful load fail over engine including a packet resolver component that determines availability of a component for an upload; and
    a processor that executes the computer executable components.

2. The computer implemented system of claim 1, the graceful load fail over engine includes a detector component that detects a missing or corrupted reference.

3. The computer implemented system of claim 1, the graceful load fail over engine includes a notification component that notifies a user where to download the missing object or obtain additional information about resolving problems associated with the missing object.

4. The computer implemented system of claim 1, the graceful load fail over engine includes a monitor component that provides a process to install the missing objects.

5. The computer implemented system of claim 4, the monitor component supplies real-time hyper links to download the missing objects on the user's machine.

6. The computer implemented system of claim 1, the packet resolver includes a metadata reader component to obtain information about missing data packets.

7. The computer implemented system of claim 1, the packet resolver includes an attribute identifying subsystem that identifies attributes of the missing data packets.

8. The computer implemented system of claim 1, the packet resolver includes an attribute populating subsystem that provides attributes for the missing data packets.

9. The computer implemented system of claim 1 further comprising an artificial intelligence component that facilitates operation of the graceful load fail over engine.

10. A method of self healing a component based application comprising:
    detecting a missing object as part of a component based application;
    determining availability of a component for an upload; and
    supplying information about the missing object, to properly read, validate, and execute the component based application.

11. The method of claim 10 further comprising providing at least one of a dummy object or a stub in place of the missing object.

12. The method of claim 10 further comprising supplying information about the missing objects via a persistence infrastructure of the component based application.

13. The method of claim 10 further comprising persistently storing information about objects as part of an infrastructure of the component based application.

14. The method of claim 10 further comprising referring back to a persistence state to supply information about the missing object.

15. The method of claim 10 further comprising supplying various forms of streaming information for the missing objects.

16. The method of claim 15 further comprising providing a class definition for the missing objects.

17. A computer implemented system that facilitates operation of a component based application, comprising a memory having stored therein computer executable components and a processor that executes the following computer executable components:
    means for providing real time information about missing objects, to self heal the component based application for a proper read, validation, and execution thereof on a user's machine;
    means for determining availability of a component for an upload; and
    means for detecting the missing objects.

18. The computer implemented system of claim 17 further comprising means for notifying a user where to download the missing objects.

19. The computer implemented system of claim 17 further comprising means for monitoring the missing objects.

* * * * *

UNITED STATES PATENT AND TRADEMARK OFFICE
CERTIFICATE OF CORRECTION

| | | |
|---|---|---|
| PATENT NO. | : 7,409,578 B2 | Page 1 of 1 |
| APPLICATION NO. | : 11/042903 | |
| DATED | : August 5, 2008 | |
| INVENTOR(S) | : Kirk Haselden et al. | |

It is certified that error appears in the above-identified patent and that said Letters Patent is hereby corrected as shown below:

In column 2, line 2, delete "up load." and insert -- upload. --, therefor.

In column 6, line 33, after "330," insert -- to --.

In column 8, line 24, delete "farther" and insert -- further --, therefor.

In column 8, line 38, delete "identifications" and insert -- identification, --, therefor.

Signed and Sealed this
Nineteenth Day of April, 2011

David J. Kappos
*Director of the United States Patent and Trademark Office*